US011672235B2

(12) United States Patent
Pineda et al.

(10) Patent No.: US 11,672,235 B2
(45) Date of Patent: Jun. 13, 2023

(54) LEASH WITH FLEXIBLE BAG DISPENSER POCKET AND STOWABLE CARRYING POUCH

(71) Applicants: Omar J. Pineda, Los Angeles, CA (US); Rebecca Setler, Los Angeles, CA (US)

(72) Inventors: Omar J. Pineda, Los Angeles, CA (US); Rebecca Setler, Los Angeles, CA (US)

( * ) Notice: Subject to any disclaimer, the term of this patent is extended or adjusted under 35 U.S.C. 154(b) by 248 days.

(21) Appl. No.: 16/947,634

(22) Filed: Aug. 11, 2020

(65) Prior Publication Data

US 2021/0045359 A1   Feb. 18, 2021

Related U.S. Application Data

(60) Provisional application No. 62/885,902, filed on Aug. 13, 2019.

(51) Int. Cl.
*A01K 27/00* (2006.01)
*B65F 1/00* (2006.01)

(52) U.S. Cl.
CPC .......... *A01K 27/008* (2013.01); *A01K 27/003* (2013.01); *B65F 1/0006* (2013.01); *B65F 2240/136* (2013.01)

(58) Field of Classification Search
CPC .. A01K 27/008; A01K 27/003; A01K 27/006; A01K 23/005; A01K 23/00;

(Continued)

(56) References Cited

U.S. PATENT DOCUMENTS 5,441,017 A   8/1995 Lindsay
5,727,500 A * 3/1998 Conboy ............... A01K 23/005
                                                119/858

(Continued)

FOREIGN PATENT DOCUMENTS

GB   2470422        11/2010
GB   2470422 A  *  11/2010  ........... A01K 27/006

OTHER PUBLICATIONS

"Bags on Board Silicone Bone Bag Dispenser with Refill 14 count," printed from the internet (www.petco.com) and available at least as early as May 21, 2019.

(Continued)

*Primary Examiner* — Kristen C Hayes
(74) *Attorney, Agent, or Firm* — Trenner Law Firm, LLC; Mark Trenner

(57) ABSTRACT

An example device includes a flexible bag dispenser pocket for use with a leash for a pet, and an opening formed in the flexible bag dispenser pocket. The opening is closed in a default state, and widens when opposite sides of the flexible bag dispenser pocket are squeezed toward each other. The device also includes an attachment for attaching the flexible bag dispenser pocket to the leash. At least one waste bag is inserted into the flexible bag dispenser pocket and can be removed from the flexible bag dispenser pocket by pulling the waste bag through the opening. In an example, a stowable carrying pouch for carrying used waste bags may also be provided as part of the device. A handle of the carrying pouch may be looped around the leash and the dispenser pocket may serve as a stop to keep the carrying pouch from sliding down the leash.

10 Claims, 11 Drawing Sheets

(58) Field of Classification Search
CPC ........... A45C 7/0059; A45C 7/01; A45C 7/04; A45C 1/02
See application file for complete search history.

(56) References Cited

U.S. PATENT DOCUMENTS

| | | | | |
|---|---|---|---|---|
| 6,418,881 | B1* | 7/2002 | Starratt | A01K 27/006 |
| | | | | 119/769 |
| 7,252,219 | B1* | 8/2007 | Tsengas | A45C 11/20 |
| | | | | 119/51.01 |
| 10,455,815 | B2* | 10/2019 | Knight | E01H 1/1206 |
| 10,492,472 | B1* | 12/2019 | Moloznik | A01K 27/008 |
| 11,266,123 | B2* | 3/2022 | Jirsa | A01K 27/004 |
| 2008/0006223 | A1* | 1/2008 | Sugalski | A01K 27/006 |
| | | | | 119/795 |
| 2008/0173662 | A1 | 7/2008 | Che | |
| 2011/0272442 | A1 | 11/2011 | Che | |
| 2015/0144072 | A1* | 5/2015 | Whitefield | A01K 27/008 |
| | | | | 224/191 |
| 2019/0023487 | A1 | 1/2019 | Lu | |
| 2022/0125017 | A1* | 4/2022 | Langenbach | A01K 27/008 |

OTHER PUBLICATIONS

"Wholesale Pet leash and Dog Waste Bag Dispenser Combo Durable and Lightweight Walking Training Dog Leash", printed from the internet (www.cutepetsmart.com) and available at least as early as May 21, 2019.
"Messy Mutts Silicone Waste Bag Holder," printed from the internet (rufflifepet.com) and available at least as early as May 21, 2019.
"So Phresh Silicone Dog Waste Bag Dispenser in Assorted Colors with Refills, Count of 30," printed from the internet (www.petco.com) and available at least as early as May 21, 2019.
"Tuff Mutt Leash Attachment Poop Bag Holder," printed from the internet (chewy.com) and available at least as early as May 21, 2019.
"Beco Pocket Eco Friendly Dog Poop Bag Holder," printed from the internet (smile.amazon.com/gp/product/B01MSD4HIP/ref=ppx_yo_dt_b_search_asin_title?ie=UTF8&th=1&psc=1) on Aug. 7, 2020 (NOTE: Product Details states Date First Available: Jan. 25, 2017).
"Doggee Bag Dispenser, Pink," printed from the internet (amazon.co.uk/Baggee-Pink-sdogpnk-Doggee-Dispenser/dp/B00453JAPY) on Aug. 7, 2020 (NOTE: Product Reviews dating at least as early as 2015).

"Alcott Waste Bag Carrier, Black" printed from the internet (amazon.com/alcott-Waste-Bag-Carrier-Black/dp/B00GGD10QI/ef=pd_bxgy_199_img_3/132-3751728-7336865?_encoding=UTF8&pd_rd_i=B00GGD10QI&pd_rd_r=fe14176c-8725-11e9-a137-4559e07eef3d&pd_rd_w=S1mKS&pd_rd_wg=Tvi81&pf_rd_p=a2006322-0bc0-4db9-a08e-d168c18ce6f0&pf_rd_r=MWN99QYQC3SFK0K2YBGT&psc=1&refRID=MWN99QYQC3SFK0K2YBGT) on Aug. 7, 2020 (NOTE: Product Reviews dating at least as early as 2018).
"ProGivity Dookie Hookie Dog Poop Hands Free Bag Holder," printed from the internet (amazon.com/ProGivity-Stainless-Warping-Breaking-Bending/dp/B06Y4LQ7XN/ref=asc_df_B06Y4LQ7XN/?tag=hyprod-20&linkCode-df0&hvadid-241991316466&hvpos=1o4&hvnetw=g&hvrand=4524427766060128865&hvpone=&hvptwo=&hvqmt=&hvdev=c&hvdvcmdl=&hvlocint=hvlocphy=9030968&hvtargid=pla-400329150899&psc=1) , on Aug. 7, 2020 (NOTE: Product Reviews dating at least as early as 2017).
Kurgo Duty Bag for Dogs, printed from the internet (amazon.com/Kurgo-Refillable-Dispenser-Universal-Convenient/dp/B0723HG1GR/ref=cm_cr_arp_d_product_top?ie=UTF8) on Aug. 7, 2020 (NOTE: Product Reviews dating at east as early as 2017).
"Geekria Earbuds Silicone Case" printed from the internet (amazon.com/Geekria-Silicone-Urbeats3-Protection-Earphone/dp/B07B3NQB7T/ref=sr_1_28?dchild=1&keywords=geekria+silicone&qid=1596924421&sr=8-28), on Aug. 10, 2020 (NOTE: Product Details states Date First Available: Feb. 27, 2018).
"Turdlebag," printed from the internet (amazon.com/Turdlebag-TB2017B-Navy-Blue/dp/B01MPVNPJ2/ref=cm_cr_arp_d_product_top?ie=UTF8) on Aug. 11, 2020 (NOTE: Product Reviews dating at least as early as 2017).
"Poop Bag Carrier," printed from the internet (wildone.com/products/poop-bag-carrier) on Aug. 11, 2020 (NOTE: Product Reviews dating at least as early as 2018).
"Petego Looper Scooper Waste Bag Dispenser," printed from the internet (smile.amazon.com/gp/product/B003OYIB0A/ref=ppx_yo_dt_b_search_asin_title?ie=UTF8&psc=1) on Aug. 7, 2020 (NOTE: Product Reviews dating at least as early as 2011).
"Dexas Pets Pooch Pouch Flexible Dog Treat/Training Treat Clip Pouch, Light Gray" for sale on Amazon.com at https://smile.amazon.com/Dexas-Pooch-Pouch-Flexible-Training/dp/B084GXZ9SV/ref=sr_1_10?crid=1E7DBX1VNLH0&keywords=silicone%2Bdog%2Btreat%2Bpouch&qid=1668813684&sprefix=silicone%2Bdog%2Btreat%2Bpouch%2Caps%2C266&sr=8-10&th=1, PDF 11 pages, Product believed to be available prior to Aug. 2019.

* cited by examiner

LEASH WITH FLEXIBLE BAG DISPENSER POCKET AND STOWABLE CARRYING POUCH

PRIORITY CLAIM

This application claims the priority benefit of U.S. Provisional Patent Application No. 62/885,902 filed on Aug. 13, 2019 titled "Leash With Flexible Bag Dispenser Pocket And Stowable Carrying Pouch" of Omar J. Pineda and Rebecca Setler, hereby incorporated by reference in its entirety as though fully set forth herein.

BACKGROUND

There are no leashes on the market that are equipped with a system for carrying empty dog waste bags and concealing and carrying the full bag of waste after pick up. This requires owners to buy a leash, a waste bag dispenser and a carrier for the full bag separately. The waste bag dispensers and full bag carriers currently on the market all have serious drawbacks as detailed below, and since the three components are not designed to efficiently work together, when they are combined, the outcome is often complicated, bulky and unsightly.

Currently available dog waste bag dispensers require the dog owner to use both hands for bag removal. In the case of roll dispensers, bags are pulled through a gasket or hole, then both hands are needed to find the seam on the roll of plastic bags, then tear a bag off. In the case of dispensers that are connected to the leash by a keychain, carabiner or other dangling connector, one hand must be used to stabilize the dispenser while the other removes the bag. In some cases, there is additional hardware, such as a zipper or snaps that require two hands to open and/or close. Once the bag is removed, the owner must open the bag, which can be difficult and sometimes even requires licking a finger to get the sides of the bag to separate from one another. Then, after picking up after the dog, the owner needs to again use both hands to knot the bag. All of these actions cause the dog owner to be unable to maintain a full grip on the leash for good control of theft dog, which is especially problematic when managing multiple dogs or a large, unruly or aggressive dog. While the brief inconveniences listed above are mostly an annoyance for dog owners, the distraction of fiddling with dispensers and bags, combined with the dog owner releasing their full grip on their leash could put the dog, the dog owner and the public at risk if the dog escapes, runs into traffic or, at worst, lunges away from the owner to attack a person or another dog.

The simplest solution that solves the need for one handed access to waste bags on a walk is to put the bags in a pants or coat pocket, but even this simple solution has its drawbacks. It is not an option when wearing clothing that does not have pockets. When removing bags the dog owner needs to be careful not to inadvertently pull out and drop other items stored in the pocket, or when removing other items from the pocket, the waste bag could accidentally be pulled out and dropped, leaving the dog owner without a bag when it is time to scoop. Unused waste bags forgotten in a pocket typically end up in the washer or dryer or pulled out of the pocket and thrown away without being used. Dog owners who rely on their clothes pockets often forget to bring bags along, since they need to be loaded in the outfit the owner is wearing that day.

Most bag dispensers are designed to carry rolls of dog waste bags that are torn off one at a time as needed. There are many flaws that cause difficulty for dog owners when using these roll-type dispensers. Many of them do not accommodate all brands and sizes of rolls of waste bags, which owners typically only discover after they have purchased and tried to load the rolls. When tearing off a bag, it is often difficult to find the seam, so after struggling to tear the bag off at the correct point, owners often end up with too much of the next bag on the roll hanging out of the dispenser, requiring them to try to stuff the excess back in through the hole. In some cases, the opposite happens, and the bag is torn off too close to the dispenser, which allows the end to retreat back inside the dispenser, where it cannot be accessed to pull out the next bag. The dog owner is then required to open the dispenser to remove the roll, access the end and re-thread it through the dispensing hole. If these issues occur, it causes the owner to spend additional time using both hands to resolve these issues, resulting in more time spent without a full grip on their leash. In the case of roll-type dispensers made of rubber or silicone, consumers complain that the bags on the roll stick to the interior surface, so the roll does not spin and the bags cannot be pulled out of the dispenser. In at least one case, an Amazon seller of these dispensers even includes a warning that bags may stick to the dispenser. Bags can get caught in zippers or gasket pull through holes, causing the bags to tear and/or causing the zipper to stick.

Existing products for picking up and transporting dog waste do not allow for, or encourage more eco-friendly methods of disposing of dog waste, in spite of the disposal of dog waste being a major environmental issue. To avoid groundwater contamination and other public health issues, owners must pick up and dispose of their dog's waste. But the method that most owners use is picking up and sealing it in single-use plastic bags, which carry a large percentage of the estimated 10+ million tons of dog waste produced in the US each year to landfills. Current bag dispensers generally utilize only rolls of traditional dog waste pick up bags, which even when marked as "biodegradable" do not degrade in a landfill. Many dog owners are concerned about the environmental impact of their use of these single-use plastic bags, but do not have any other convenient means of disposing of dog waste. The device can be used with traditional dog waste bags, but is also designed to allow dog owners a convenient means to re-use any other type of plastic bag or wrap that they otherwise would have thrown directly into the trash.

There are very few products available for carrying full waste bags after pick up and those that are available have flaws that result in most dog owners choosing not to use them. As a result of the lack of a convenient means for carrying full waste bags, sealed bags of dog waste have become a common sight along the sides of hiking trails. Owners trying to be responsible by picking up their dog's waste do not have an easy method for carrying the full bag, so they leave it on the side of the trail, planning to pick it up when they return, but they often neglect to do so. Dog owners walking in neighborhoods without public trash cans often bag their dog's waste but toss it in the bushes or put it in the trash can of a private party without their consent. All of this bad dog owner etiquette could be eliminated with a better option for carrying full waste bags.

Existing methods for carrying full bags include hooks or rubber gaskets that grip the bag at the knot. These products often fail when used with thin waste bags that do not make a large enough knot to hold, when the contents of the bag are too heavy or when the leash moves in such a way that the bag is released from the holder. This can cause the bag to slip out and fall to the ground, possibly breaking and spilling the contents. These types of carriers cannot be used with other types of bags (e.g., plastic sandwich bags or zipper bags).

Most existing full bag carriers do not hide the contents of the waste bag, causing owners to take their walk carrying an obvious bag of waste, which can be unsightly and embarrassing. There are plastic and silicone box-type carriers and heavy canvas bags that conceal and carry waste, but they are large and bulky, making them inconvenient and adding extra weight for owners to carry while walking. Since they must be carried by hand, attached to a belt loop or dangled from the leash, even when not in use, they are visible and inconvenient to carry on a walk.

Most bag dispensers are designed to dangle from the leash, using a keychain fastener, a carabiner or a plastic clip. The swinging of these bag dispensers causes them to be distracting and annoying for dog owners, and dogs are highly distracted by them. Puppies and playful dogs often jump up to try to grab them, especially since they appear similar to dog toys, often appearing to be plastic dog bones or rubber balls. The fasteners on dangling bag dispensers often break, causing the bag dispenser to be unusable or resulting in the bag dispenser dropping to the ground on the walk, leaving the dog owner without a bag when they need it.

There are no products that provide convenient ways to carry un-knotted full bags, and carrying an open bag by hand increases the risk of accidental spillage and exposes the dog owner to the odor from the bag. Knotting bags on a walk can be awkward, especially when the bag is very full and does not leave a long enough section of bag to easily tie a knot. People with hand dexterity issues may have additional difficulties with knotting a bag.

The problems associated with removing, opening and knotting bags are even more problematic in the winter, when dog owners are wearing gloves. Finding the seam to tear a bag from a roll becomes an even bigger challenge when the dog owner is unable to feel for the seam with a gloved hand, getting the sides of the bag to separate to open the bag for use is often impossible without removing a glove, and tying a knot in the bag may be difficult or impossible without removing one or both gloves.

When the leash is dropped to the ground, traditional bag dispensers often break or fail, either from dragging and bouncing on the hard ground or by catching on something. Dog owners often drop their leashes to allow their dogs a bit of freedom or to allow them to play with other dogs. When they do this, the body of hard plastic dispensers can crack into pieces, completely destroying the dispenser. Dangling connectors can snap off and velcro connected dispensers can slip or tear off of the leash. Snaps can pop open as the leash drags and zippers can get sand or dirt in them, causing them to jam.

Hard plastic or metal connectors or hooks can cause discomfort or injury if the dog owner has to suddenly grab the leash or if the leash twists around their fingers or hands when the dog is unruly.

Traditional roll-type holders completely enclose the roll, making it difficult for owners to know when they are about to run out of bags. Because owners can not tell how many bags are left on the roll, running out of bags at an inopportune moment is common. When the last bag on the roll is pulled out, the owner may not have a bag available if the dog eliminates more than once on the walk or if the dog owner is walking more than one dog and needs bags for each of the dogs.

DETAILED DESCRIPTION

Figure 1:
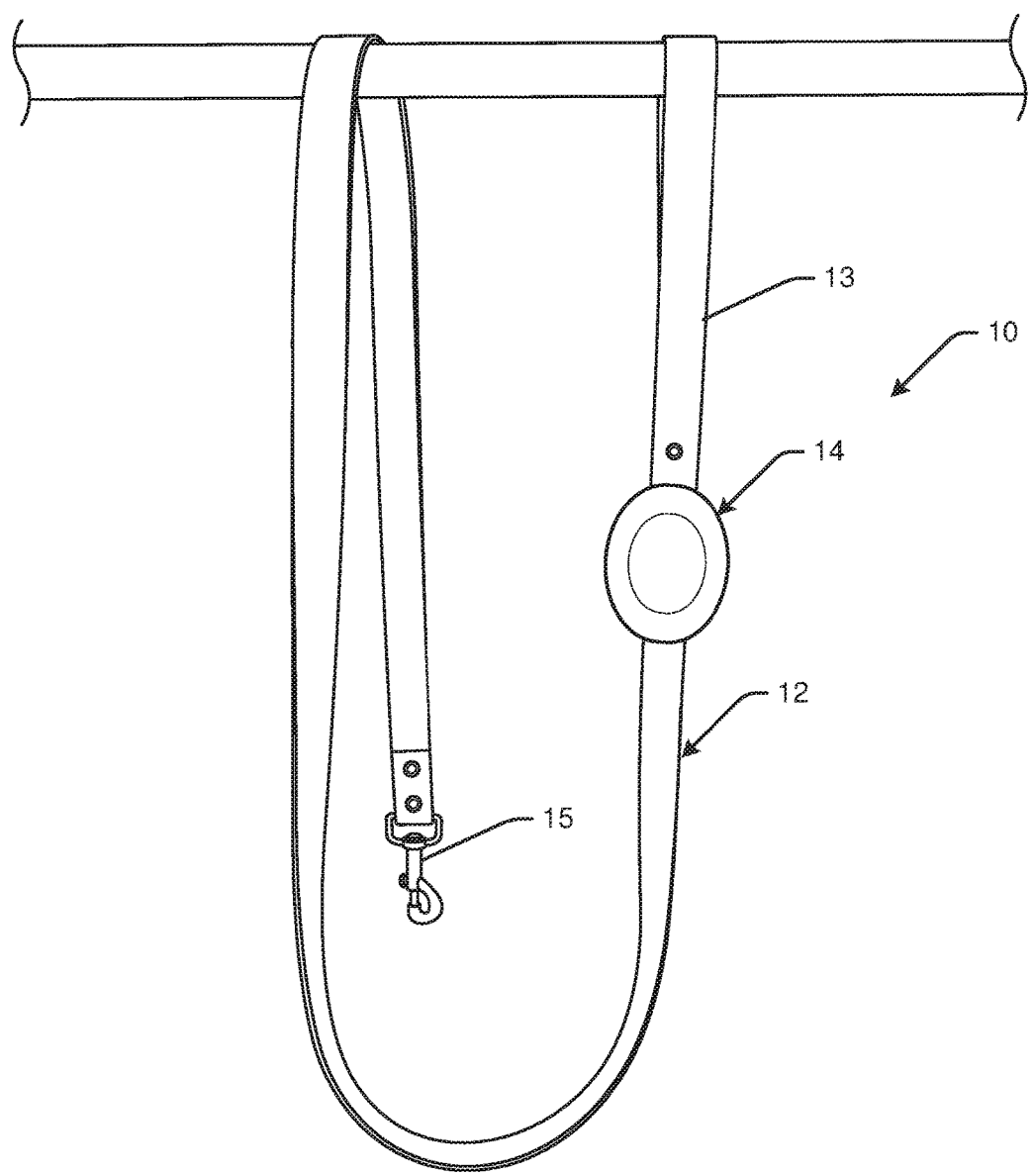
FIG. 1 shows an example leash with flexible bag dispenser pocket.

A leash with flexible bag dispenser pocket and stowable carrying pouch is disclosed. In an example, the device includes a leash, a bag dispenser, and an optional "full bag" carrier (with "full" meaning that at least some waste is in the bag). The leash may be provided as part of the device, or the user may provide their own leash (e.g., the device may be sold without the leash to work with any of a variety of different leashes).

In an example, the leash has a flexible bag dispenser pocket that is flush mounted at or near the base of the handle in a location that does not interfere with the full use of the handle. The bag dispenser pocket is made entirely of flexible rubber (or other flexible material that allows for similar function). It is noted however, that other materials may also be used, even somewhat flexible, and non-flexible material (s).

The bag dispenser pocket can dispense multiple types of individual bags or wraps or rolls of bags. Although the bags are referred to as "waste bags" for purposes of illustration, the bags may be pet waste bags, treat bags, or any other type of bag. Bags can be easily removed with one hand by reaching directly into the pocket opening. Indeed, the device may be implemented without bags at all, e.g., when used to carry treats.

The bag dispenser pocket of the device disclosed herein is flush mounted on the leash and does not use a dangling connector. As such, there is no possibility of breakage or loss due to a faulty or weak connector. Because the bag dispenser pocket is low profile and non-dangling, it is not annoying for the user and it does not distract dogs or entice dogs to grab it.

The lightweight carrying pouch of the device may be stowable at least partly within the flexible bag dispenser pocket. The carrying pouch enables the user to conceal and carry full waste bags without adding noticeable weight and without having to carry the full waste bag in their hand. The stowable carrying pouch can be stowed inside the bag dispenser pocket itself, it remains out of sight until it is needed. When in use, the stowable carrying pouch can close (e.g., be cinched closed). The stowable carrying pouch can be securely looped over or through the leash handle, without interfering with the full use of the leash handle. This can help keep the full carrying pouch from being dropped even if the bag is heavy. It can be used for any type of bag, not just bags that can be knotted. For example, the stowable carrying pouch can also be provided for use with a thin bag without a large enough knot to be carried in other types of full bag carriers.

The device disclosed herein enables dog owners to knot, fold, or twist the full bag to prevent spillage, then place it inside the carrying pouch. It is noted that the description herein refers to "dog owners" for purposes of illustration. However, the device is not limited to use by any particular end-user. For example, it is understood that a person walking a dog (or other animal) on a leash does not need to be the "owner" of the dog.

Unlike other products for carrying full bags, the device is compact and hidden when not in use, and also allows the dog owner to place an un-knotted bag into the carrying pouch, tightening the drawstring around the neck of the waste bag to cinch it closed.

The device disclosed herein allows dog owners to individually load pre opened bags into the pocket to avoid struggling to open the bag while out on a walk. Bags can be easily removed from the bag dispenser pocket with a finger and thumb even when wearing gloves, without the need for fiddling with closure hardware or a roll of bags, and knotting the bag is not required.

The bag dispenser pocket of the device disclosed herein is made of a soft, durable material that does not break readily if dropped or dragged on the ground, it is unlikely to catch on anything since it has no dangling connectors, it cannot slip off of the leash and it has no zippers that can jam. If the carrying pouch is in use, it should be removed before the leash is dropped on the ground.

In an example, the device disclosed herein is made of a soft material and is flush mounted to the leash so that it does not dangle from the leash and provides user comfort during use.

The device disclosed herein allows for dog owners an option for knowing when they are about to use the last remaining bags in the dispenser pocket. Dog waste bags come in different colors, so by using bags of one color for the first few bags loaded into the bottom of the dispenser pocket, then using bags of a different color to load the rest of the dispenser pocket, the color change alerts dog owners that they are getting to the end of their supply, reminding them to reload.

Before continuing, it is noted that as used herein, the terms "includes" and "including" mean, but is not limited to, "includes" or "including" and "includes at least" or "including at least" The term "based on" means "based on" and "based at least in part on."

Figure 2:
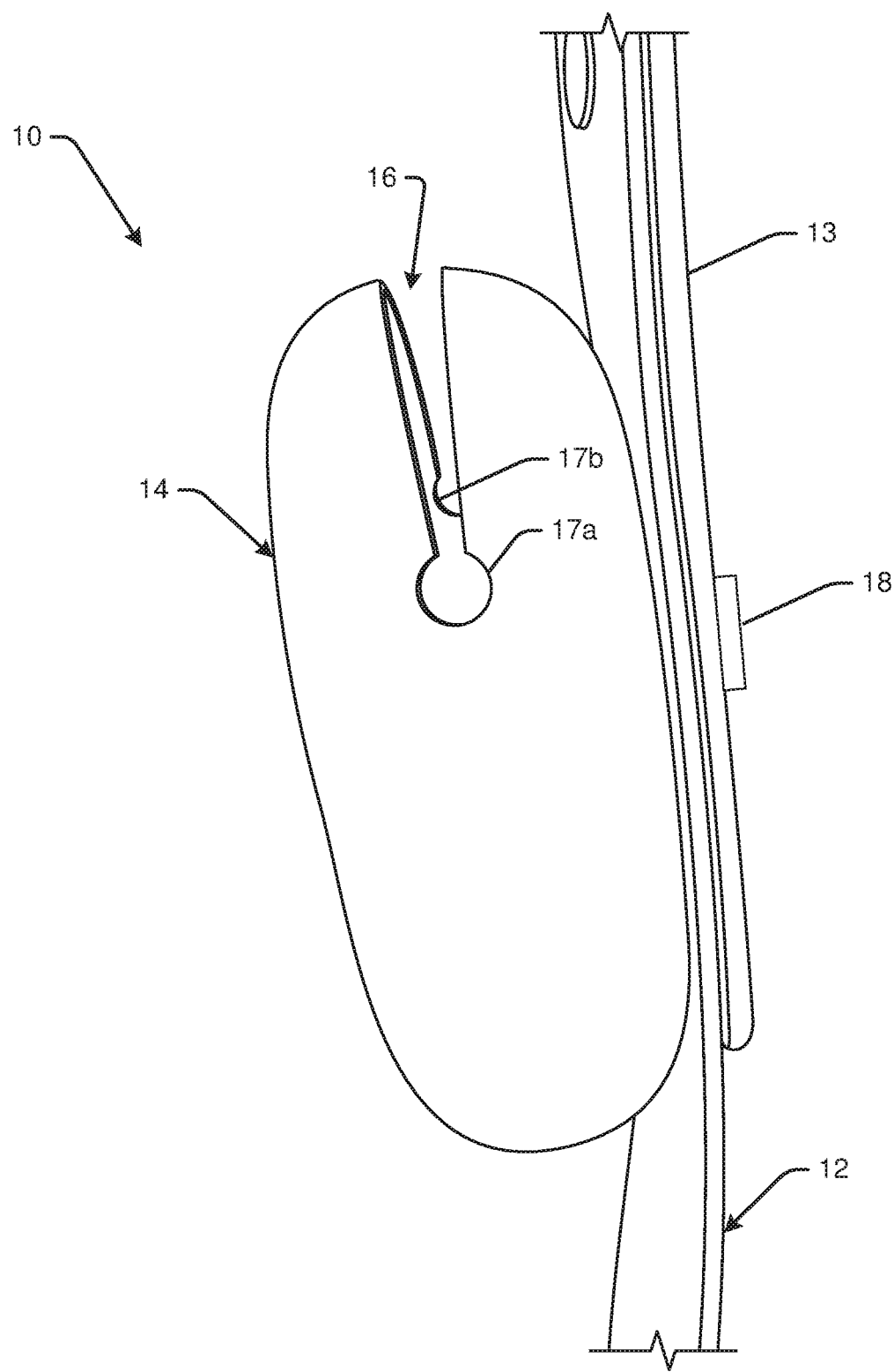
FIG. 2 is a close-up side view of the example leash with flexible bag dispenser pocket in a closed configuration.
Figure 3:
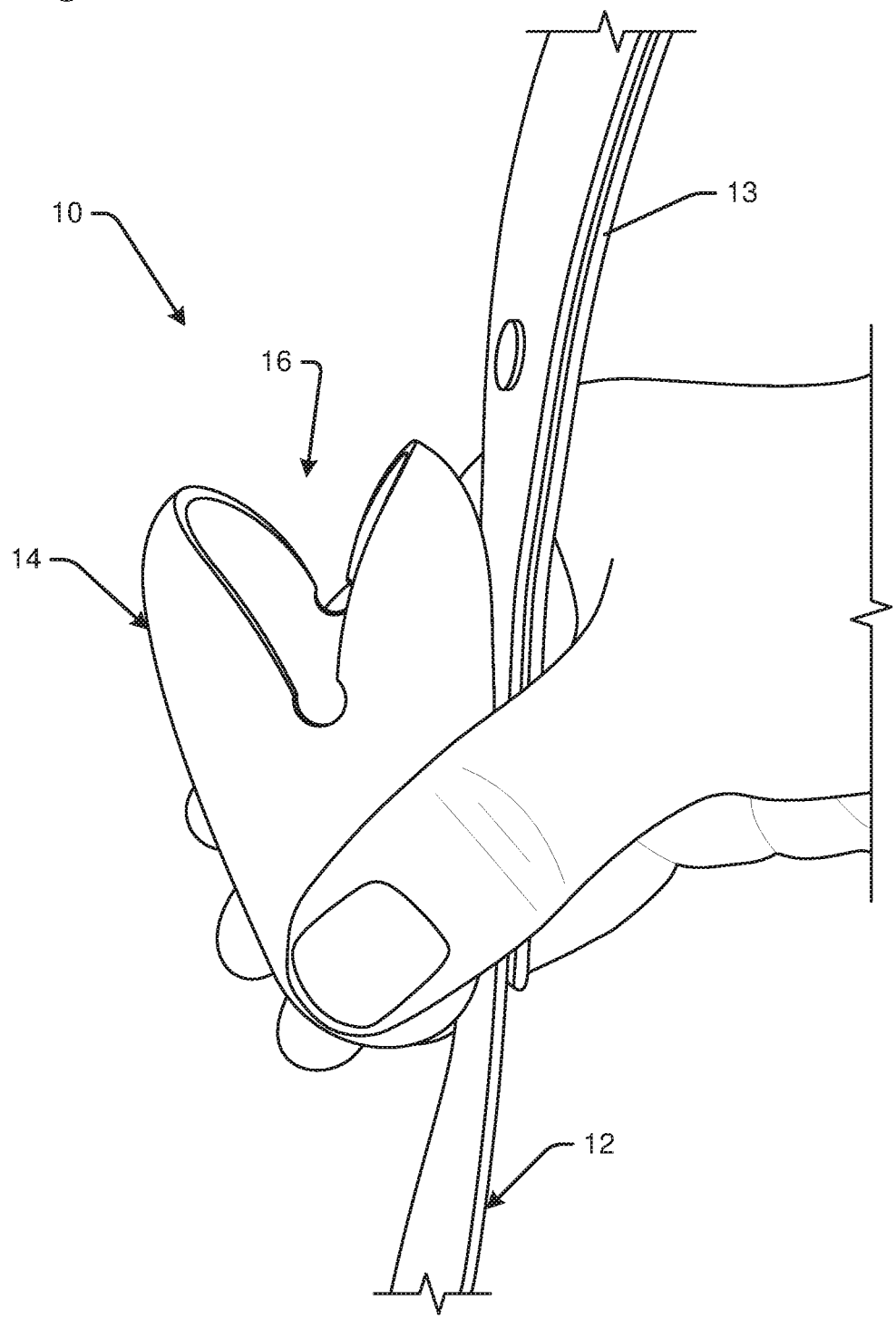
FIG. 3 is a close-up side view of the example leash with flexible bag dispenser pocket in an open configuration.
Figure 4:
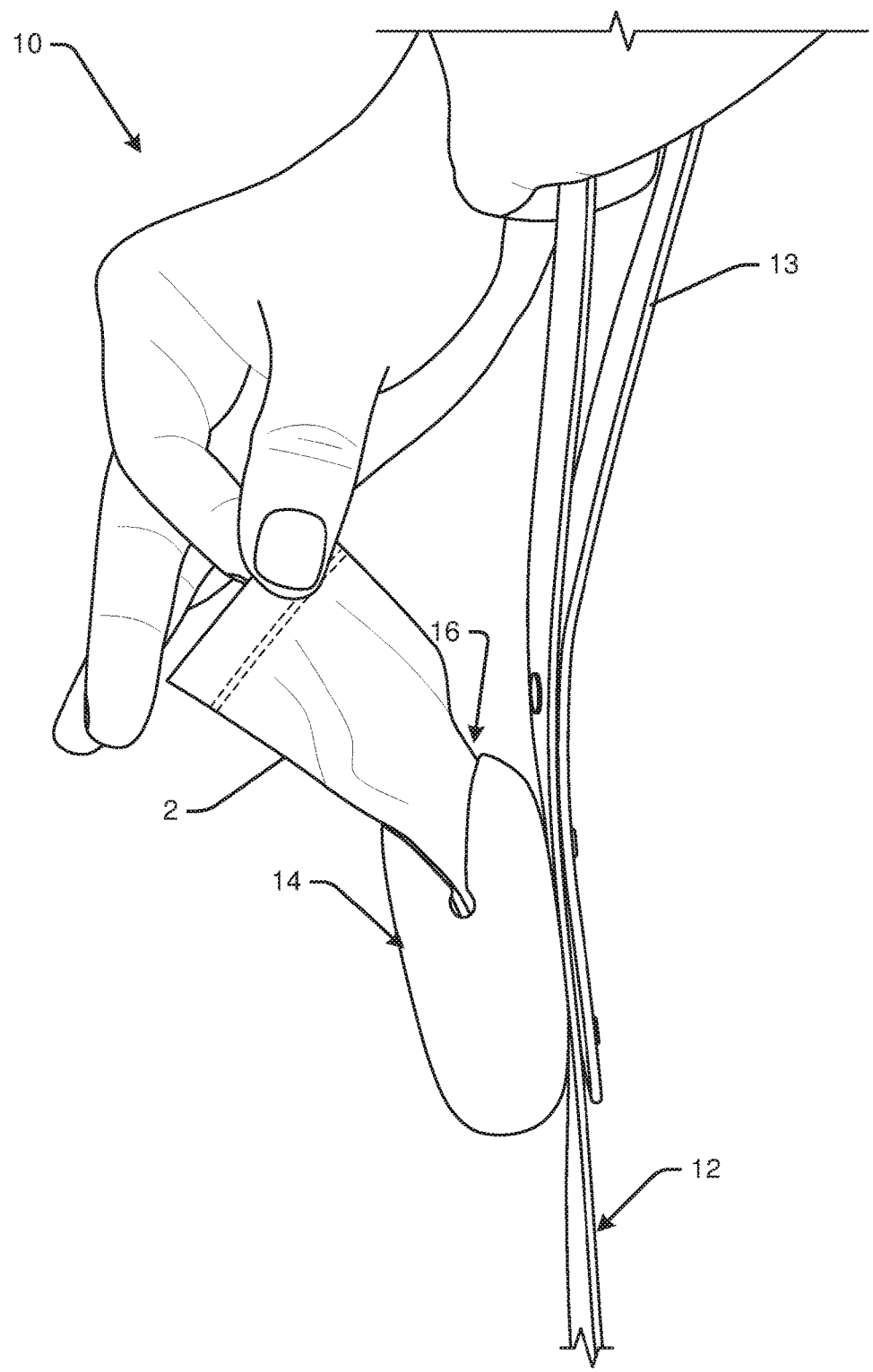
FIG. 4 illustrates a waste bag being removed from the example leash with flexible bag dispenser pocket.

FIG. 1 shows an example device 10 as it may include a leash 12 with flexible bag dispenser pocket 14. It is noted that the leash 12 is shown hanging on a pole for purposes of illustration. The pole is not part of the device. FIG. 2 is a close-up side view of the device 10 including the example leash 12 with flexible bag dispenser pocket 14 in a closed configuration. FIG. 3 is a close-up side view of the device 10 including the example leash 12 with flexible bag dispenser pocket 14 in an open configuration. FIG. 4 illustrates a waste bag being removed from the example leash with flexible bag dispenser pocket.

The leash 12 may be any suitable leash. Although the leash is shown as a strap type leash, retractable leashes, chain leashes, cord leashes, and rope leashes (and other leash types) may also be implemented with the device 10.

The leash 12 is shown in FIG. 1 as it may include a handle 13 and an attachment end 15 for connecting to a collar for the dog or other pet.

In an example, the device 10 includes a flexible bag dispenser pocket 14. The flexible bag dispenser pocket 14 may be manufactured as a unit, or assembled from multiple pieces. In an example, the flexible bag dispenser pocket 14 is manufactured of a soft silicone rubber, although other material(s) may be used.

In an example, the flexible bag dispenser pocket 14 may be connected to a leash 12 at or near the handle 13 by way of an attachment 18. In an example, the flexible bag dispenser pocket 14 is attached so that it is flush to the leash (e.g., as shown in FIGS. 1-4). That is, the flexible bag dispenser pocket 14 is not loosely attached to the leash (e.g., by hanging from a strap) when it is flush mounted to the leash, so that it does not bounce around and/or possibly fall off of the leash 12.

Any suitable attachment 18 may be provided, although a rivet is shown in FIG. 2. For example, the attachment 18 may be a permanent or semi-permanent attachment, such as the rivet (or rivets) seen in FIG. 2. In another example, the attachment 18 may be a removable attachment, such as a screw. In yet another example, the attachment 18 may be a loop that slides over the leash, much like a belt loop on a pair of pants. Still other attachments are contemplated as being within the scope of the disclosure, whether now known or later developed, as will be readily appreciated by those having ordinary skill in the art. It is noted that the attachment 18 may be formed as part of the housing of the flexible bag dispenser pocket 14, or separately attached thereto. Indeed, the flexible bag dispenser pocket may even be formed as part of the leash and not separately attached thereto.

An opening 16 is formed in the flexible bag dispenser pocket 14. The opening 16 can be provided in any suitable configuration. For example, the opening 16 may be provided on the top, the bottom, the front, and/or the back of the flexible bag dispenser pocket 14. In FIG. 2, the opening 16 is shown formed between the opposite sides. Circular openings 17a, 17b connect on each end of the opening 16 to aid in automatically opening when the sides of the flexible bag dispenser pocket 14 are squeezed.

In an example, more than one opening may be provided. In an example, the opening 16 is closed in a default state, as seen in FIGS. 1 and 2. The opening 16 is widened when opposite sides of the flexible bag dispenser pocket 14 are squeezed together or toward each other, as illustrated in FIG. 3.

At least one waste bag 2 (shown for purposes of illustration in FIG. 4) is inserted into the flexible bag dispenser pocket 14, in an example, when the opening 16 is at least partly widened (e.g., by squeezing). Any suitable type, size, and configuration of waste bag 2 may be implemented. For example, the waste bag 2 may be provided individually, as part of a group of bags, or as a roll. In addition, one or more waste bag 2 may be provided into the flexible bag dispenser pocket 14 at any given time. The waste bag 2 is removed from the flexible bag dispenser pocket 14 by pulling the waste bag 2 through the opening 16. In an example, the waste bag 2 may be pulled through the opening 16 even when the opening is closed or at least partly closed, e.g., as in the default state.

In an example, the bag dispenser pocket 14 can hold up to 20 dog waste bags 2, depending on the brand (size and thickness of bags varies) and whether the bags 2 are folded prior to loading or pushed into the dispenser pocket 14 without folding (this decreases the number of bags the dispenser pocket can accommodate). The number of bags 2 the dispenser pocket 14 can accommodate may also be reduced if the carrying pouch 20 (FIGS. 5-8) is stored in the bag dispenser pocket along with the waste bags.

Figure 5:
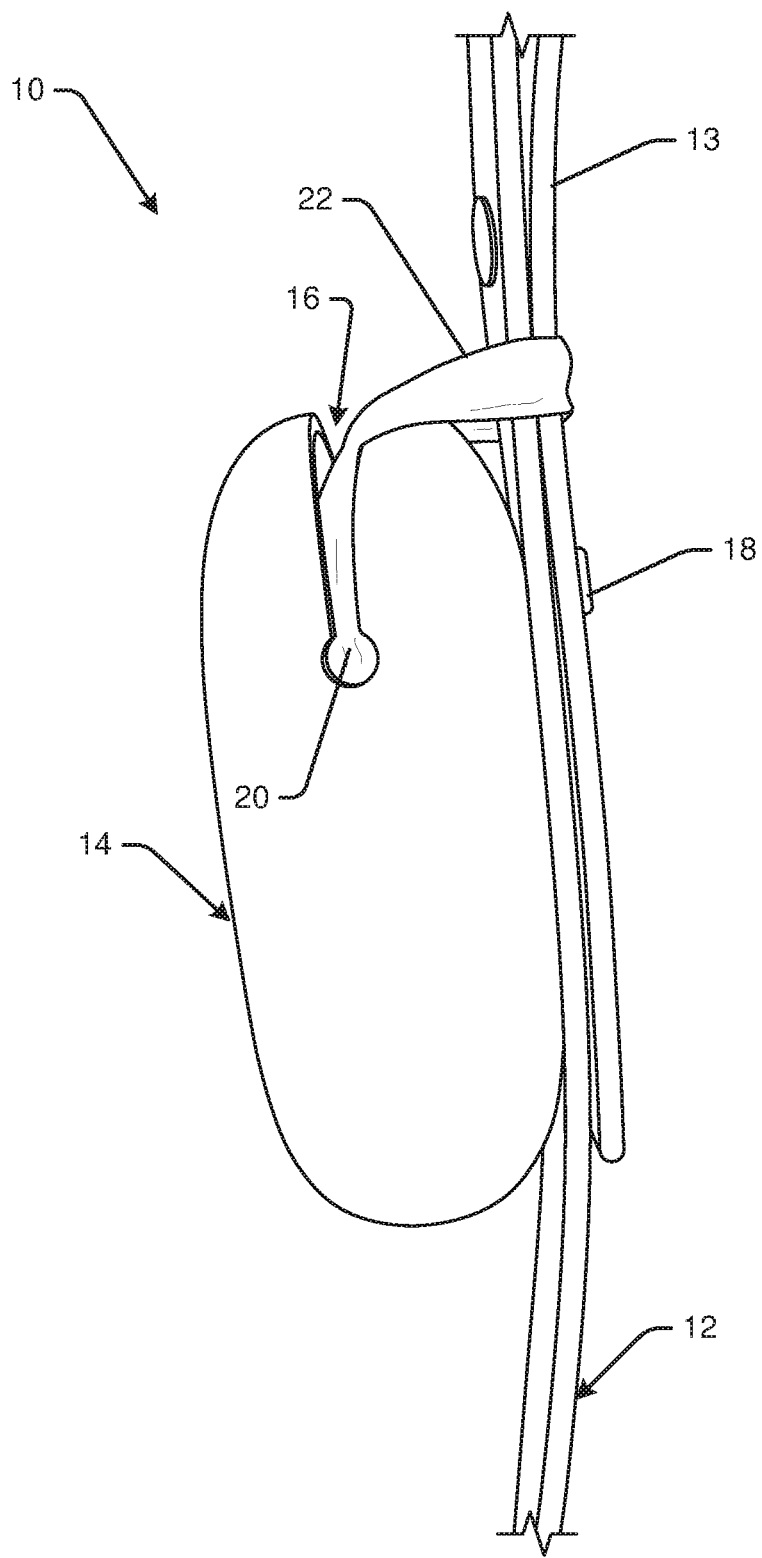
FIG. 5 is a close-up side view of the example leash with flexible bag dispenser pocket and an example stowable carrying pouch looped around the leash handle and stowed inside the dispenser pocket.
Figure 6:
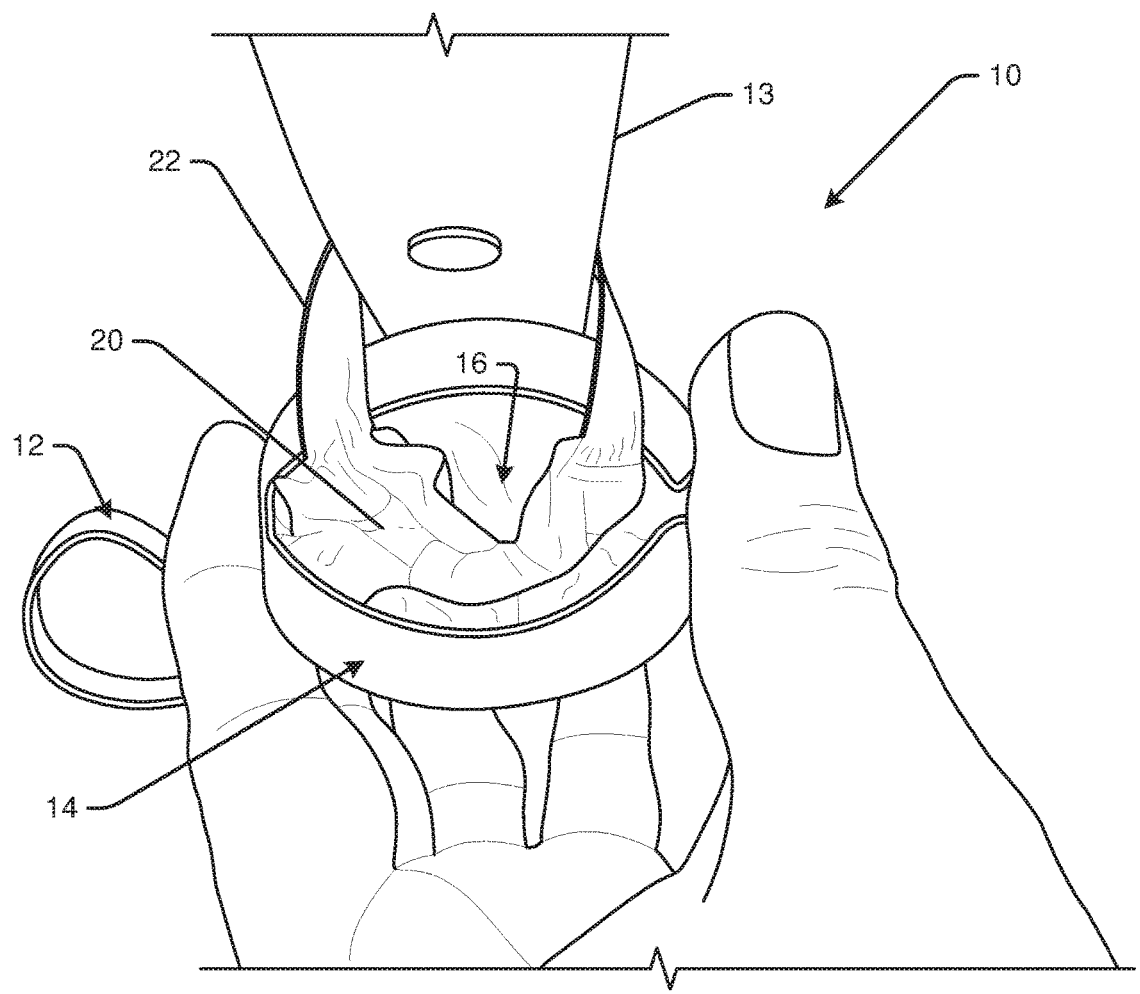
FIG. 6 is a close-up top view of the example leash with flexible bag dispenser pocket with the stowable carrying pouch shown in FIG. 5.
Figure 7:
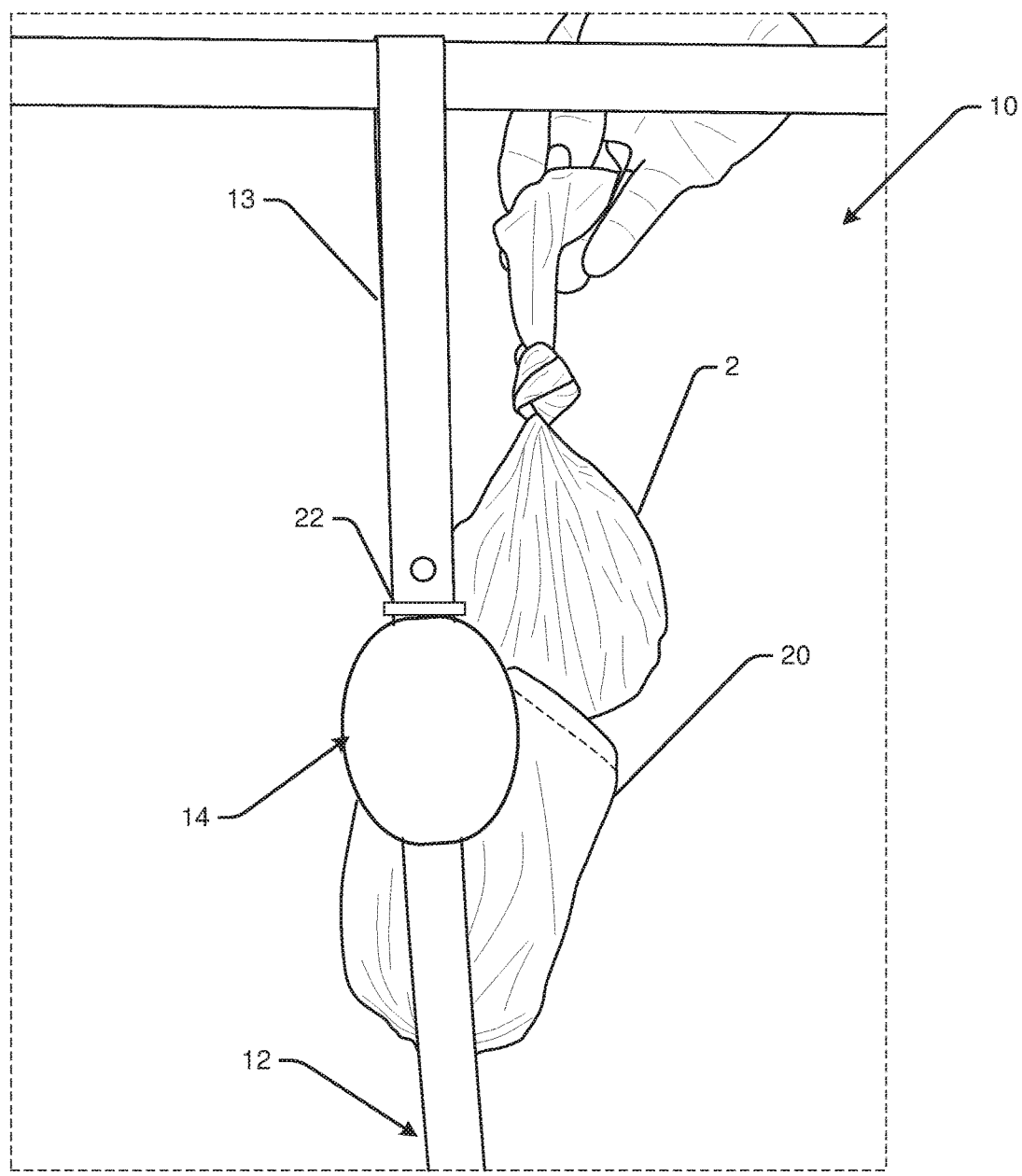
FIG. 7 illustrates a filled waste bag being put into or taken out of the example carrying pouch shown in FIGS. 5 and 6.
Figure 8:
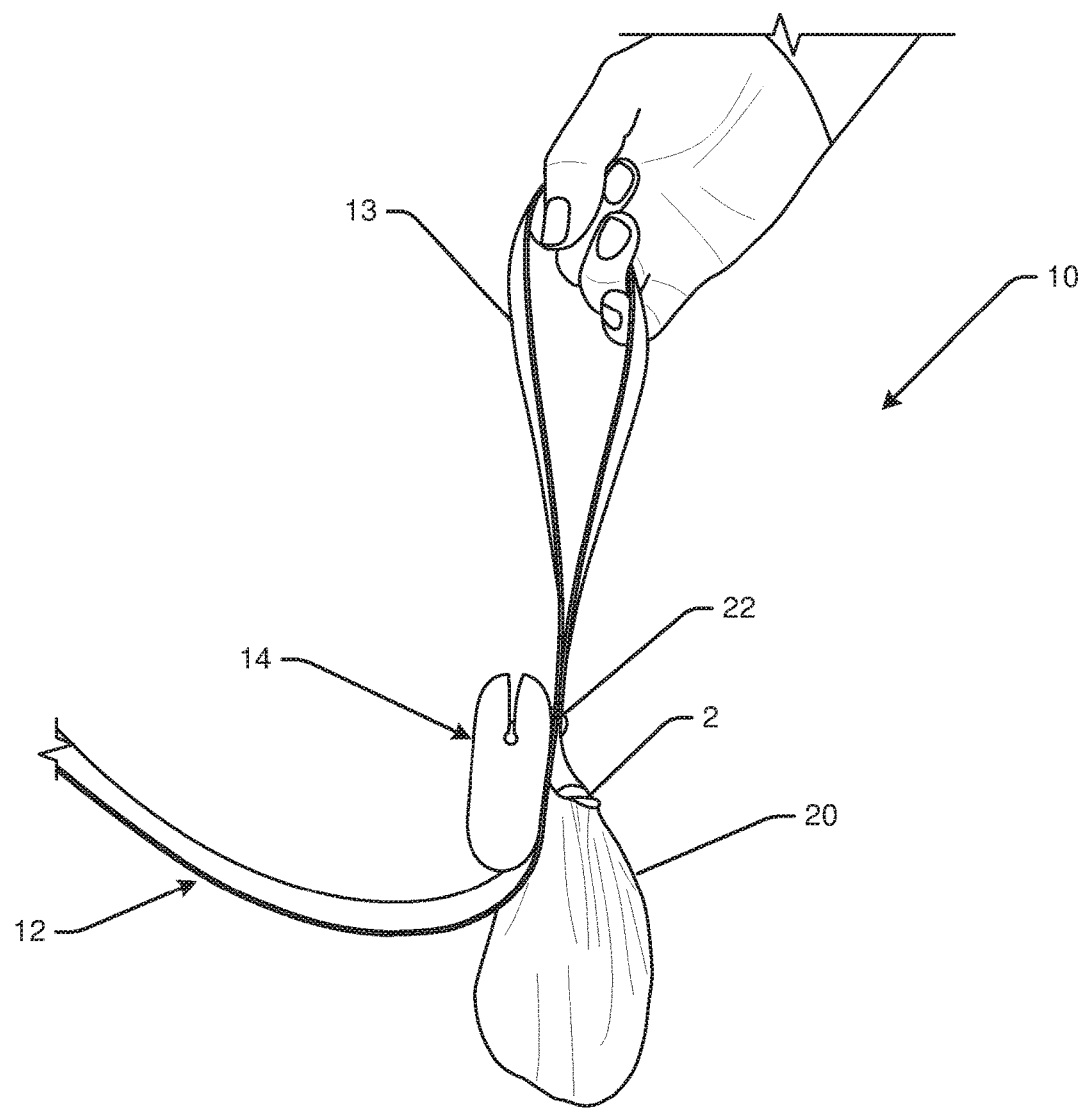
FIG. 8 illustrates the filled waste bag in the carrying pouch for transport with the example leash.
Figure 9:
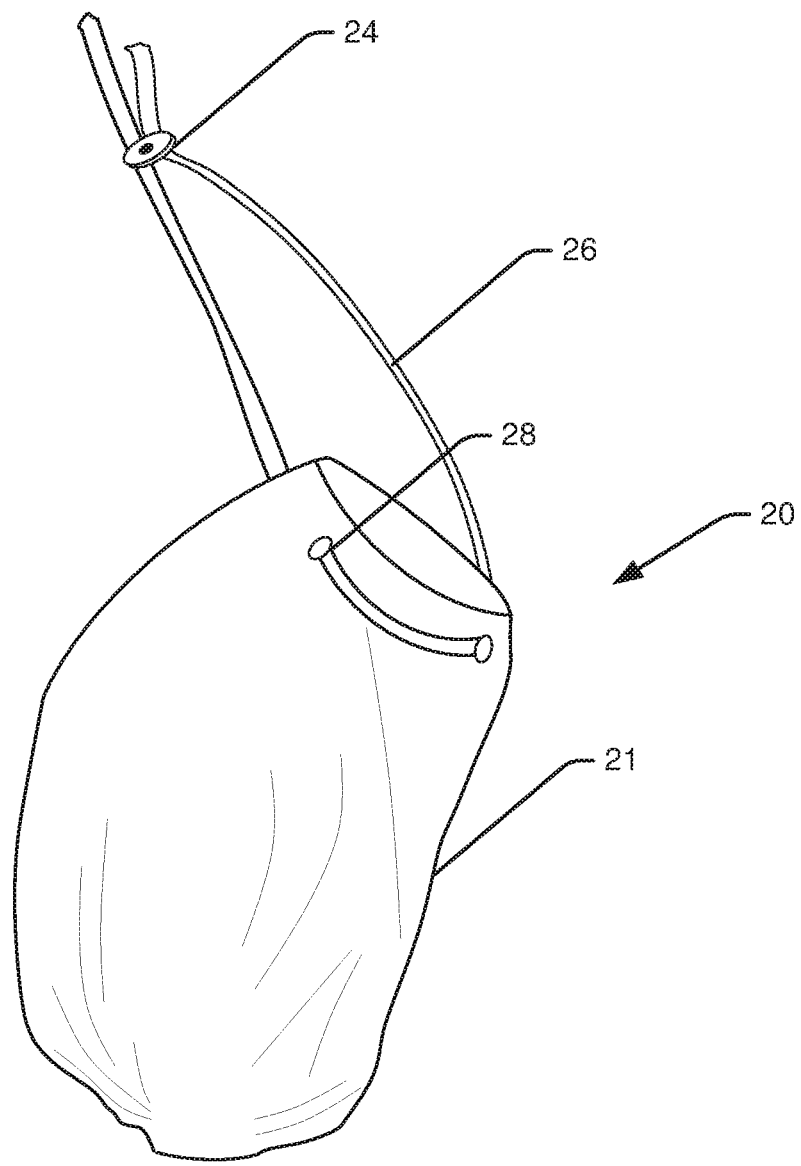
FIG. 9 shows an example of the carrying pouch.

FIG. 5 is a close-up side view of the device 10 with an example handle portion 22 of the carrying pouch that may be looped around the leash handle 13 and the carrying pouch stowed inside the dispenser pocket 14. FIG. 6 is a top view showing the stowable carrying pouch 20 from FIG. 5. FIG. 7 illustrates a filled waste bag 2 being put into or taken out of the example carrying pouch 20 shown in FIGS. 5 and 6. FIG. 8 illustrates the filled waste bag in the carrying pouch for transport with the example leash. FIG. 9 shows an example of the carrying pouch 20. The example carrying pouch 20 may be a lightweight fabric bag 21 with a cinch mechanism 24 on the cord(s) 26 of the handle 22. The handle 22 may be pulled to tighten around a hem area 28 to at least partly or fully close the opening of the bag 21.

When implemented with the stowable carrying pouch 20, the device 10 allows owners to have a discreet, comfortable way to carry full bags once they have picked up after their dog, leaving both hands free to control their dog's leash. An ultralight nylon fabric carrying pouch that may be stowed inside the bag dispenser pocket along with the disposable bags can be removed and slipped over the leash handle to hold the full waste bag until the dog owner is able to dispose of it. In an example, the dispenser pocket serves as a stop to help hold the handle portion of the carrying pouch 20 from sliding down on the leash.

The carrying pouch is a lightweight nylon fabric pouch that closes with a drawstring. The drawstring can be pulled closed to fully contain and conceal a bag or wrap filled with dog waste that is knotted, folded or twisted closed, or the drawstring can be cinched closed around the neck of an un-knotted bag to seal it off. If the drawstring is used to seal the bag off, the top of the bag or wrap is left sticking out of the top of the bag so there is no risk of the bag opening inside the pouch.

The bag dispenser pocket acts as a stop to keep the carrying pouch in place and prevent it from sliding down the leash. This stop feature also allows a disposable bag with handles to hang on the leash if the user prefers not to use the carrying pouch. Dog owners who regularly use the carrying pouch can skip the step of threading the pouch over the leash handle on each walk by keeping the pouch threaded over the handle at all times, shifting the pouch to the bag dispenser pocket side of the leash, compressing the pouch and stashing it in the bag dispenser pocket when not in use, then removing it and shifting it to the opposite side of the leash to stash and carry the full waste bag when needed. The leash can be used with or without the carrying pouch, as some dog owners may want the convenience, comfort and durability of the dispenser pocket, but have no need to use the carrying pouch for transporting their full bags, due to easy access to trash cans on their walk.

While the primary purpose of the dispenser pocket 14 is carrying and dispensing waste bags 2, it can also be used for holding dog treats. With the open dispenser pocket and convenience of having the dispenser mounted on the leash, dog owners can quickly and easily access treats with one hand, which is important since dog training works best with quick access to the treats to assure proper timing of rewards.

It is also noted that there are alternative uses for the bag dispenser pocket 14. In an example when using it as a treat dispenser, the device 10 can hold both dog waste bags and treats or exclusively treats. Dog owners often carry treat holders, especially when training their dogs or to reward their dogs for eliminating outside. They are typically large, bulky units designed to be worn around the waist or attached to the owner's belt or belt loop. The flexible open pocket feature of the dispenser pocket 14 allows owners to reach in with one hand to quickly and conveniently remove treats as needed.

The device 10 can also assist dog owners in maintaining good control of their dog, maximizing their ability to keep a good grip on the leash and minimizing the need to release their grip on the leash to access, open and knot the waste bag and carry the full waste bag after cleaning up after their dog. Non-roll bags may be used or individual bags can be removed from the roll in advance and bags may be opened prior to loading so the dog owner simply needs to reach into the opening with one hand, pulling out an individual bag that is already opened and ready to use. If desired, the dog owner can skip the step of knotting the bag and simply place it in the carrying pouch, cinching it closed.

In an example, dog owners do not need to carry a full roll of dog bags, so the device 10 is able to dispense multiple types of individual dog bags. This includes individual bags torn from a roll before loading and dog waste bags that do not come on a roll, such as folded bags, bags with handle ties, and flushable bags. Second-use plastic bags, such as grocery or produce bags, zipper bags, or bread bags can also be used, as can other items that can be used to wrap dog waste, such as foil-type snack bags, plastic shipping envelopes and fast food sandwich wraps, which would otherwise be thrown directly into the trash. Unlike roll-type dispensers, when using the device, dog owners can also stash other items they need for their walk in the dispenser pocket, including dog treats, keys or individually wrapped antibacterial wipes.

The EPA recommends flushing dog waste, but dog owners generally do not flush their dog's waste after walking their dogs and using traditional dog waste bags. While there are flushable dog bags on the market, these cannot be tied in a knot before flushing, and thus require owners to carry an open bag of dog waste on their walks. The carrying pouch 20 of the device 10 disclosed herein allows owners to twist or fold the open end of the full bag 2 around the part of the bag that contains the waste to prevent spillage, then enclose it in the carrying pouch 20 or put the full bag 2 in the carrying pouch 20 and cinch the drawstring around neck of the bag, sealing it off and offering a convenient way to carry the flushable bag and dog waste home to the toilet.

Dog owners who would like to flush their dog's waste, but prefer not to use flushable bags can pick up their dog's waste with a traditional dog waste bag or second-use bag or wrap (grocery or produce bags, bread bags, newspaper bags, potato chip bags, fast food sandwich wrappers, plastic shipping envelopes and packing materials, etc.). The bag or wrap can be folded before enclosing in the carrying pouch to prevent spillage, or the top of the bag or wrap can be twisted and cinched with the drawstring on the pouch 20 to allow the owner to bring the waste to a toilet to be emptied out of the bag or wrap and flushed. This reduces the environmental impact of dog waste disposal by throwing away only the empty bag or wrap, not the dog waste.

Dog owners whose dogs have small, firm stools can carry toilet paper and a folded paper bag in the rubber dispenser pocket, using the toilet paper to pick up the waste, then depositing the waste and toilet paper in the paper bag. The paper bag can then be folded or twisted closed and carried home in the carrying pouch 20 where the toilet paper and waste can be emptied into the toilet and flushed, and the paper bag can be thrown in the trash, completely eliminating the use of plastic bags.

Before continuing, it should be noted that the examples described above are provided for purposes of illustration, and are not intended to be limiting. Other devices and/or device configurations may be utilized to carry out the operations described herein. The operations shown and described herein are provided to illustrate various examples. Still other operations may also be implemented.

Figure 10:
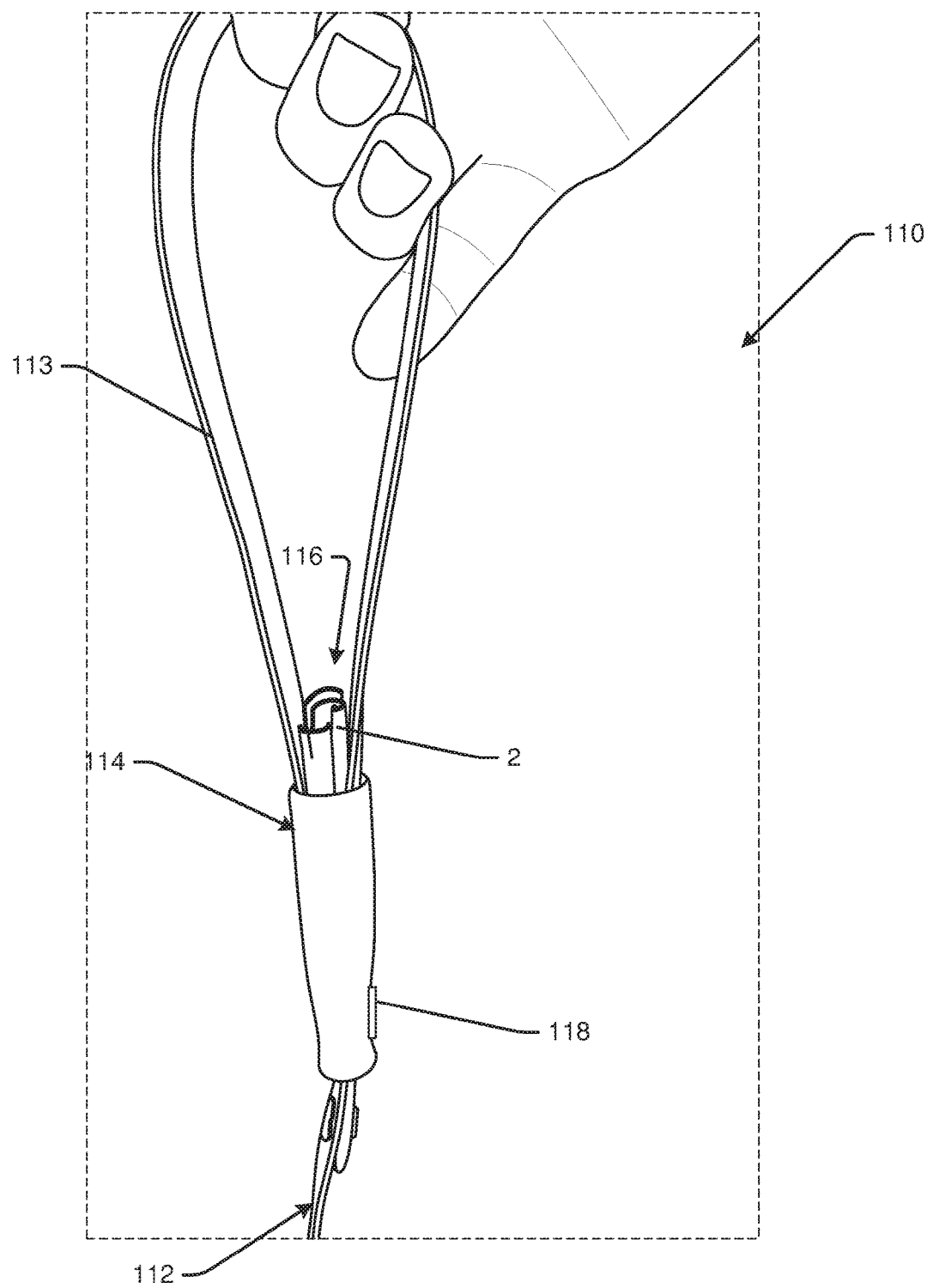
FIG. 10 is a perspective view of another example leash with flexible bag dispenser pocket.
Figure 11:
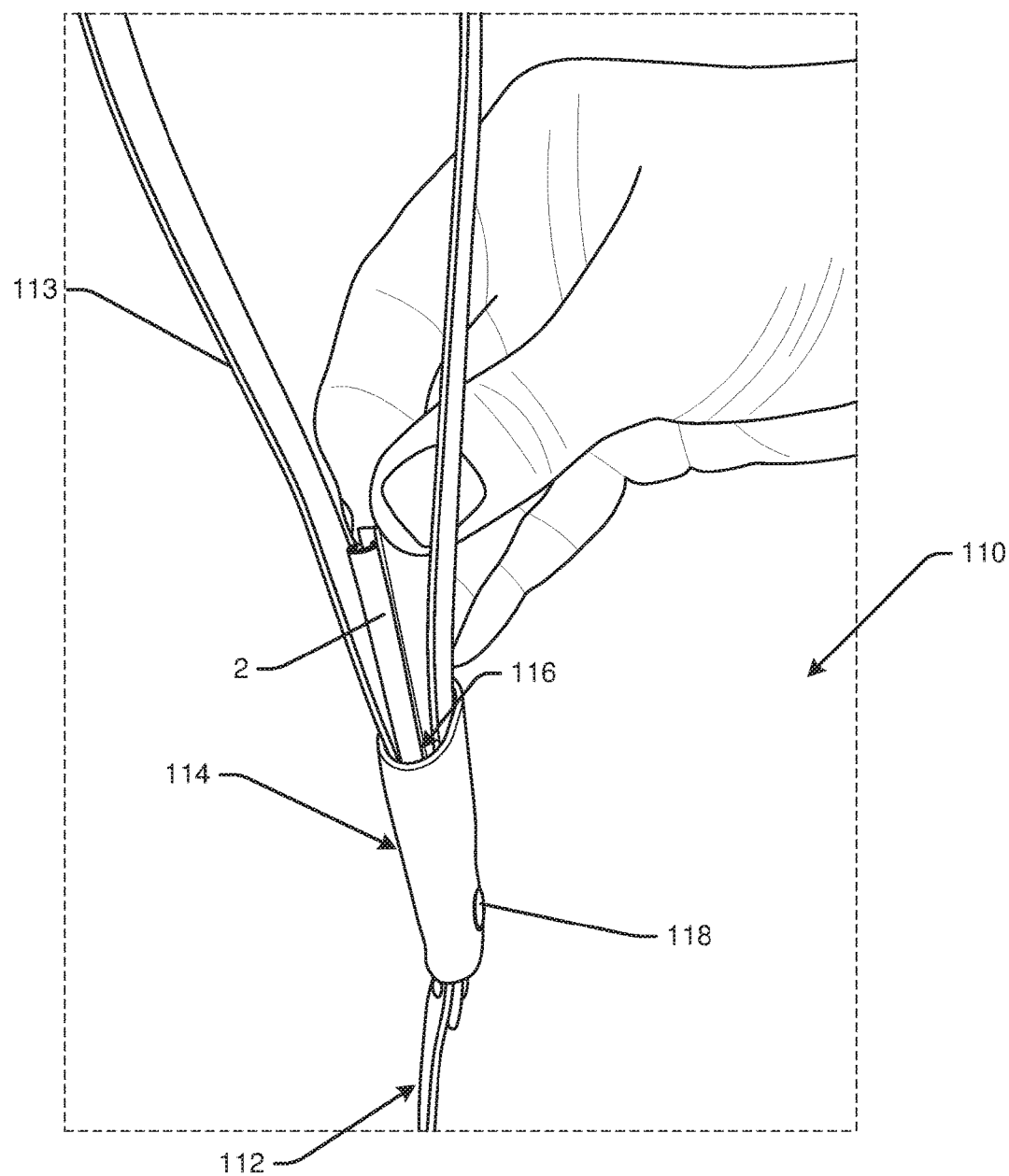
FIG. 11 illustrates a waste bag being inserted into or removed from the flexible bag dispenser pocket of FIG. 10.

FIG. 10 is a perspective view of another example of the device 110 for a leash 112 having a flexible bag dispenser pocket 114. FIG. 11 illustrates a waste bag 2 being inserted into or removed from the flexible bag dispenser pocket 114 of FIG. 10.

In the example shown in FIGS. 10-11, the device 110 includes a flexible bag dispenser pocket 114 attached to the leash 112 by wrapping around a handle 113 of the leash 112. The pocket has an opening 116 formed inside a loop of the handle 113 of the leash 112. The opening 116 is configured to receive one or more waste bag 2 therein for stowage without being bulky or hanging from the leash. A bottom portion of the flexible bag dispenser pocket 114 is closed by the handle 113 of the leash 112 to retain at least one waste bag 2 therein. The waste bag 2 can be inserted into the flexible bag dispenser pocket 114 through the opening 116, and can be removed by pulling the waste bag 2 back out through the opening 116.

In an example, the device 110 includes an attachment 118 (e.g., a rivet, screw, hook-and-loop, or other attachment) for attaching the flexible bag dispenser pocket 114 to the leash 112 at a lower portion of the handle 113. In an example, the flexible bag dispenser pocket 114 is connected at a base of the handle 113. In another example, the pocket 114 may be provided elsewhere on the leash 112.

In this example, the carrying pouch described above may also be implemented. For example, the handle of the carrying pouch may be looped through the handle (e.g., the handle/strap on the carrying pouch may have a button, snap, etc. that would allow it to be opened, slid through the leash handle and closed so it's hanging from the inside of the leash handle instead of over the whole handle.

Still other examples of the device are also contemplated. For example, the device may include a leash with a rubber dispenser pocket, but no carrying pouch. In another example, the device may include a leash with another type of dispenser (e.g., hard plastic, etc.) with a similar carrying pouch.

In another example, the device may include a leash with a rubber dispenser pocket of a different shape/size than those shown.

In another example, a dispenser device is configured so that it can be mounted on the leash to serve as a "stop" for waste bags slipped over the leash handle. That is, a "stop" that prevents or reduces the likelihood of the waste bag from sliding down the length of the leash. The dispenser pocket may be implemented with any suitable waste bags, such as the handle-type waste bags, waste bags with a slit or other opening for sliding over the leash handle, etc.

In another example, the device may include a leash of a different width or length or made from a different material.

In another example, the device may include a leash with the dispenser pocket attached in a different way. For example, the dispenser pocket may be sewn, bonded or screwed onto the leash instead of the rivets shown in the drawings. In another example, the dispenser pocket may be molded to have a channel down the back to slide it to the leash prior to sewing or riveting the handle, etc. The dispenser pocket may even be formed as part of the leash 12 in another example.

In another example, the device may include a leash with a dispenser pocket mounted in a different location on the leash instead of at or just below the leash handle.

In another example, the device may include a leash with a dispenser pocket made of a different material. Other example materials include but are not limited to leather, plastic, and may include a silicone or elastic top that allows for the open pocket single hand bag removal method.

In another example, the device may include a leash with a rubber dispenser pocket that has a decorative element (e.g., a logo, medallion, etc.) added instead of a plain dispenser pocket.

In another example, the device may include a leash with a rubber dispenser pocket with some sort of closure hardware such as but not limited to a magnet or snap.

In another example, the device may include a rubber dispenser pocket sold separately from the leash and designed to be flush mounted to the dog owner's existing leash with a temporary connector (e.g., by a a rubber strap, a channel molded down the back, velcro or elastic straps, etc.), or by threading the leash through slits on the back side of the dispenser pocket.

In another example, the device may include a stowable carrying pouch made of light fabric, netting, rubber, or other material.

In another example, the device may include a carrying pouch made with a waterproof coating or some other material so that it can be used for both scooping and carrying. Another example may include a washable, reusable option.

In another example, the device may include a lightweight carrying pouch for use with a washable liner or disposable liners that enable the pouch to be used for both scooping and carrying, and then only the liner needs to be disposed of.

In another example, the device may include a carrying pouch with a different type of closure (e.g., elastic, snaps, etc.) instead of a drawstring.

In another example, the device may include a carrying pouch with hardware added (e.g., a cord lock or decorative element, a silicone-lined slider bead, etc.).

In another example, the device may include a lightweight fabric carrying pouch that loops through (instead of over) the leash handle or attaches to the leash in a different way. For example, the pouch may have a separate flush mounted holder (e.g., that can be wrapped around the leash, attached with a keychain or carabiner, etc.).

In another example, the device may include a carrying pouch made to be carried differently (e.g., looped on the wrist, hung from a belt loop, etc.).

In another example, the device may include a carrying pouch sold separately from a leash.

In another example, the device may include a kit that includes a rubber dispenser pocket and lightweight carrying pouch to be used with the dog owner's existing leash.

It is noted that the examples shown and described are provided for purposes of illustration and are not intended to be limiting. Still other examples are also contemplated as will be readily appreciated by those having ordinary skill in the art after becoming familiar with the teachings herein.

The invention claimed is:
1. A leash device comprising:
   a lightweight carrying pouch with a handle, the handle for looping around the leash to connect the carrying pouch to the leash;

a bag dispenser pocket having a front face, a back surface, and opposite sides between the front face and the back surface;

wherein the bag dispenser pocket is provided flush on the leash so that the bag dispenser pocket does not dangle from the leash and further serves as a stop on the leash for the handle of the carrying pouch;

wherein at least one waste bag is inserted into the bag dispenser pocket when an opening slit is widened;

wherein the at least one waste bag is removed from the bag dispenser pocket by pulling the at least one waste bag through the opening slit even when the opening slit is closed in the default state; and wherein the handle of the carrying pouch is hemmed in an upper portion of the carrying pouch so that the handle can cinch the carrying pouch closed by pulling on the handle or the handle being pulled under weight of a full waste bag being placed into the carrying pouch.

2. The leash device of claim 1, wherein the leash is provided separately from the bag dispenser pocket.

3. The leash device of claim 1, wherein the leash is provided with the bag dispenser pocket.

4. The leash device of claim 1, wherein the leash is formed together as part of and provided as an integral unit with the bag dispenser pocket.

5. The device of claim 1, wherein the carrying pouch is stowable by inserting into the bag dispenser pocket when the opening slit is widened; and wherein the carrying pouch is still removable from the bag dispenser pocket by pulling even when the opening slit is closed in the default state.

6. The device of claim 1, wherein the handle of the carrying pouch or at least one waste bag is looped around and hangs on the leash when removed from the bag dispenser pocket such that the carrying pouch or at least one waste bag is prevented from sliding down the leash by the bag dispenser pocket.

7. A leash device comprising:
a lightweight carrying pouch with a handle, the handle for looping around the leash to connect the carrying pouch to the leash;
a bag dispenser pocket having a front face, a back surface, and opposite sides between the front face and the back surface;
wherein the bag dispenser pocket is provided flush on the leash so that the bag dispenser pocket does not dangle from the leash and further serves as a stop on the leash for the handle of the carrying pouch;
wherein at least one waste bag is inserted into the bag dispenser pocket when an opening slit is widened;
wherein the at least one waste bag is removed from the bag dispenser pocket by pulling the at least one waste bag through the opening slit even when the opening slit is closed in the default state; and
wherein the bag dispenser pocket is attached to the leash by at least one rivet or screw fastener.

8. A leash device comprising:
a lightweight carrying pouch with a handle, the handle for looping around the leash to connect the carrying pouch to the leash;
a bag dispenser pocket having a front face, a back surface, and opposite sides between the front face and the back surface; and
a semi-circular slit formed around a top portion of the bag dispenser pocket;
wherein the bag dispenser pocket is provided flush on the leash so that the bag dispenser pocket does not dangle from the leash and further serves as a stop on the leash for the handle of the carrying pouch;
wherein at least one waste bag is inserted into the bag dispenser pocket when an opening slit is widened; and
wherein the at least one waste bag is removed from the bag dispenser pocket by pulling the at least one waste bag through the opening slit even when the opening slit is closed in the default state.

9. The device of claim 8, an opening on each end of the semi-circular slit positioned to aid in automatically opening the semi-circular slit when the sides of the bag dispenser pocket are squeezed.

10. A leash device comprising:
a lightweight carrying pouch with a handle, the handle for looping around the leash to connect the carrying pouch to the leash;
a bag dispenser pocket having a front face, a back surface, and opposite sides between the front face and the back surface;
wherein the bag dispenser pocket is provided flush on the leash so that the bag dispenser pocket does not dangle from the leash and further serves as a stop on the leash for the handle of the carrying pouch;
wherein at least one waste bag is inserted into the bag dispenser pocket when an opening slit is widened;
wherein the at least one waste bag is removed from the bag dispenser pocket by pulling the at least one waste bag through the opening slit even when the opening slit is closed in the default state; and
wherein the carrying pouch is a lightweight fabric bag having a corded handle with a cinch mechanism.

* * * * *